E. G. STAUDE.
BOX TOPPING MACHINE.
APPLICATION FILED OCT. 13, 1914.

1,314,988.

Patented Sept. 2, 1919.
7 SHEETS—SHEET 1.

WITNESSES

INVENTOR
EDWIN G. STAUDE
BY
ATTORNEYS

E. G. STAUDE.
BOX TOPPING MACHINE.
APPLICATION FILED OCT. 13, 1914.
1,314,988.
Patented Sept. 2, 1919.
7 SHEETS—SHEET 2.
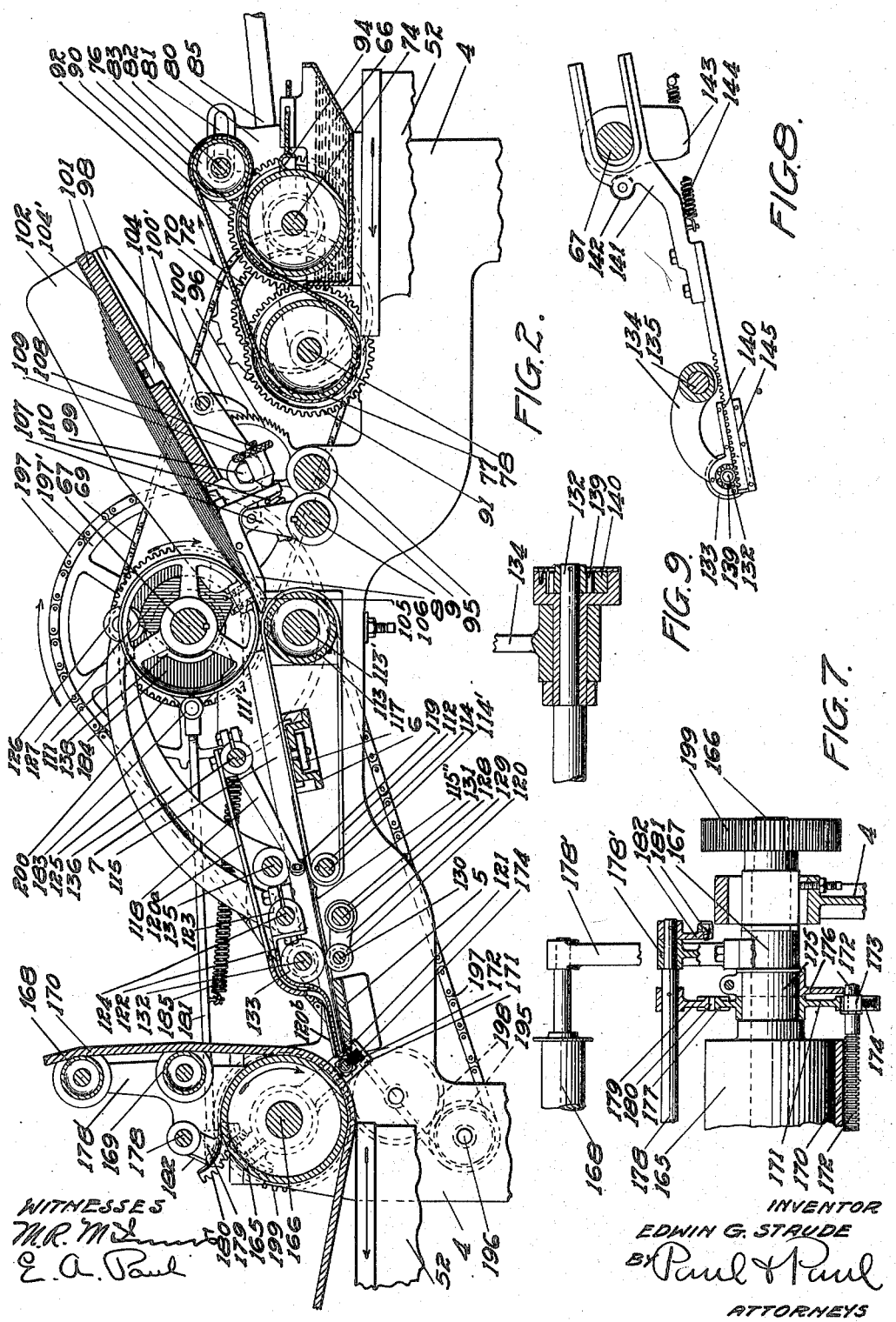
WITNESSES
M. R. McL...
E. A. Paul
INVENTOR
EDWIN G. STAUDE
BY Paul & Paul
ATTORNEYS

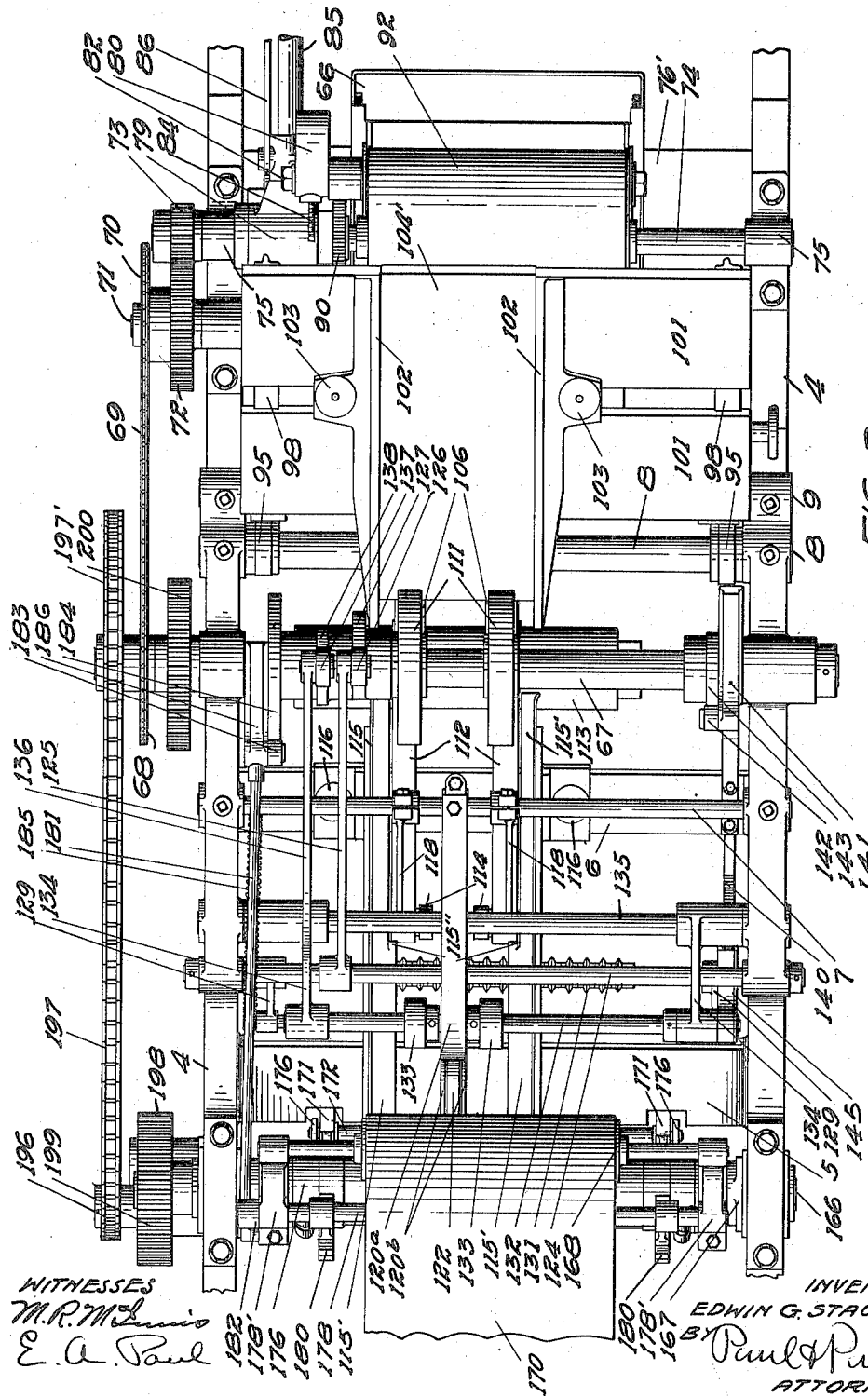

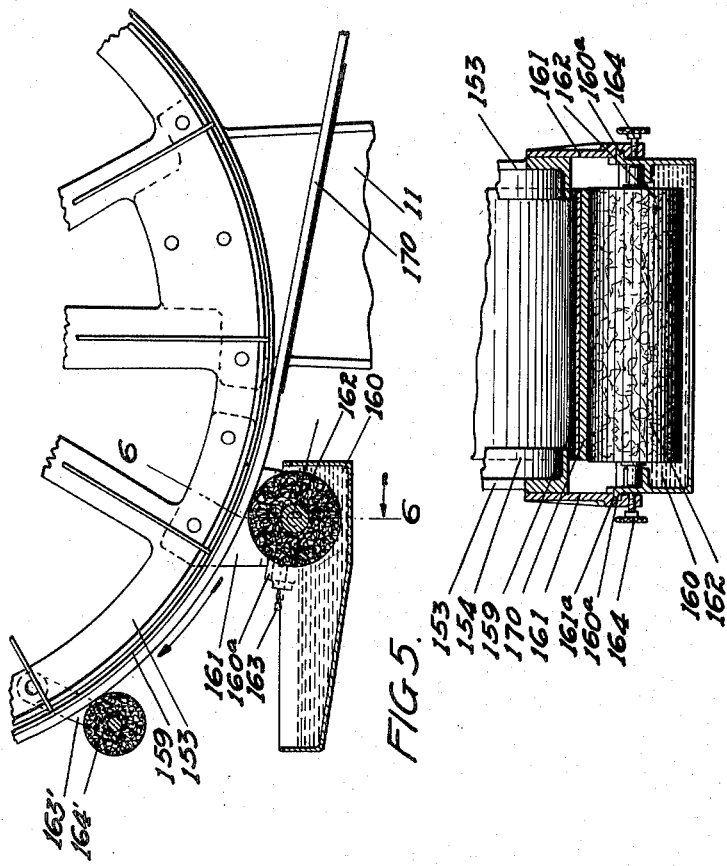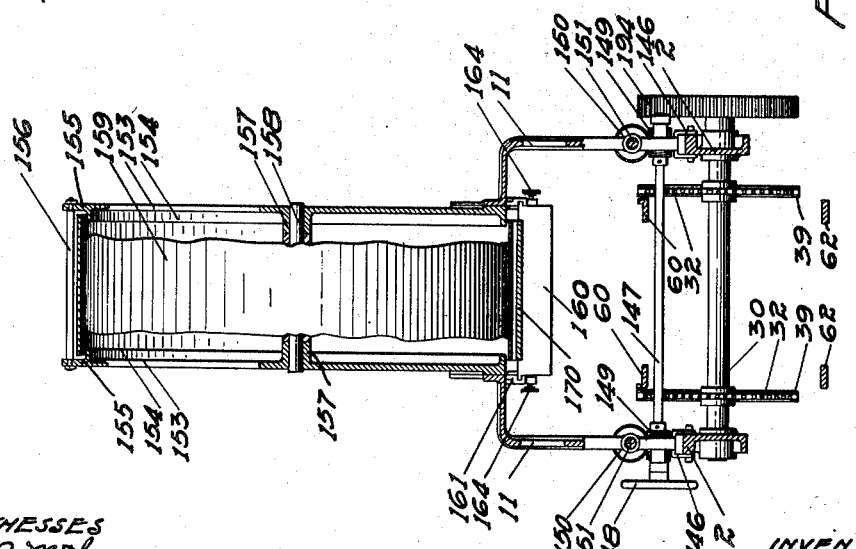

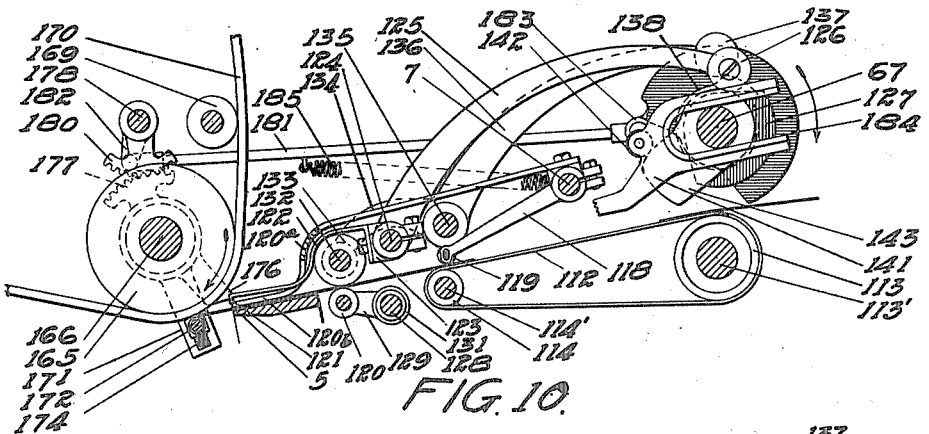
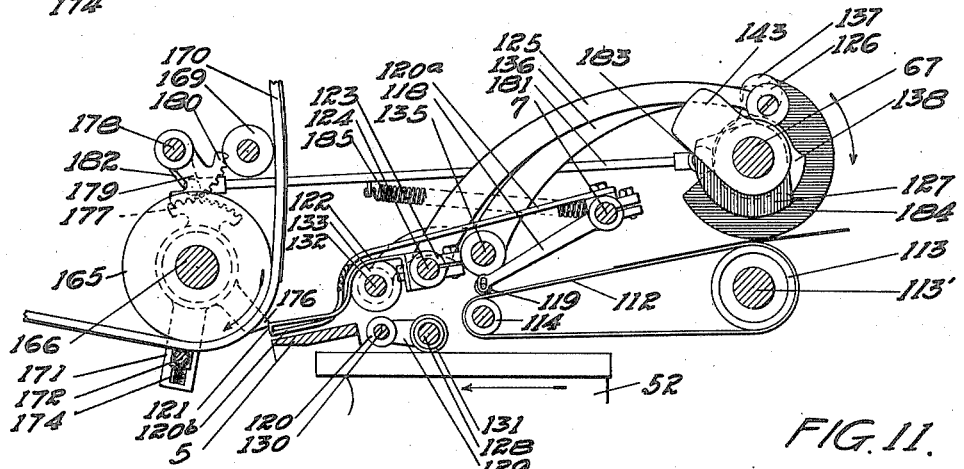
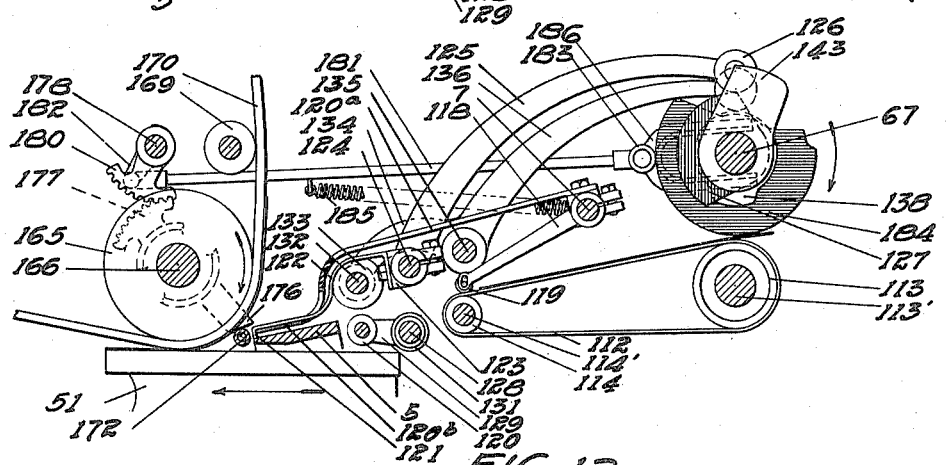

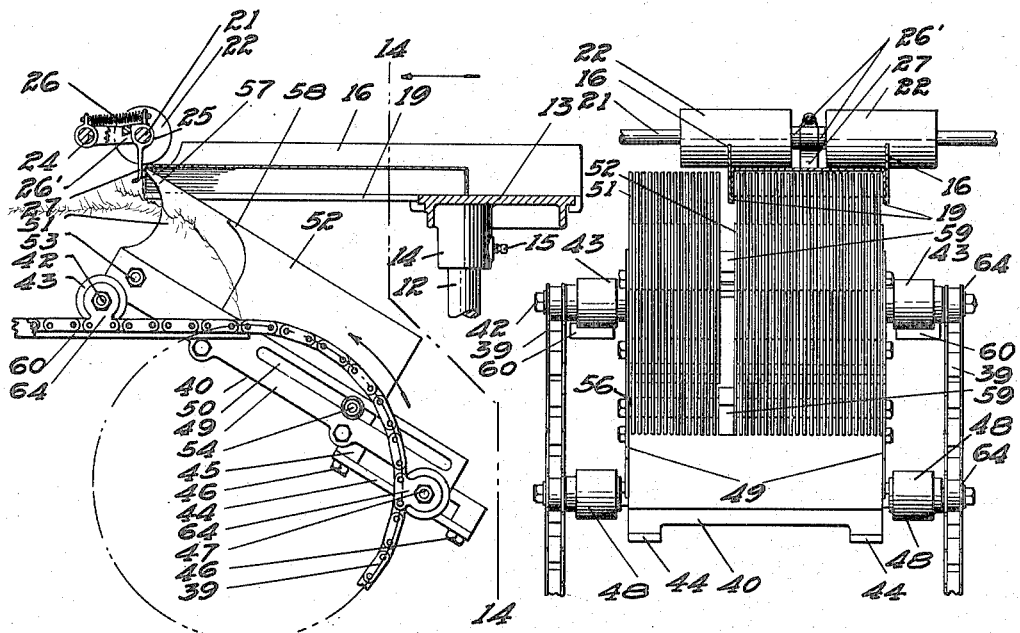
FIG.13.   FIG.14.
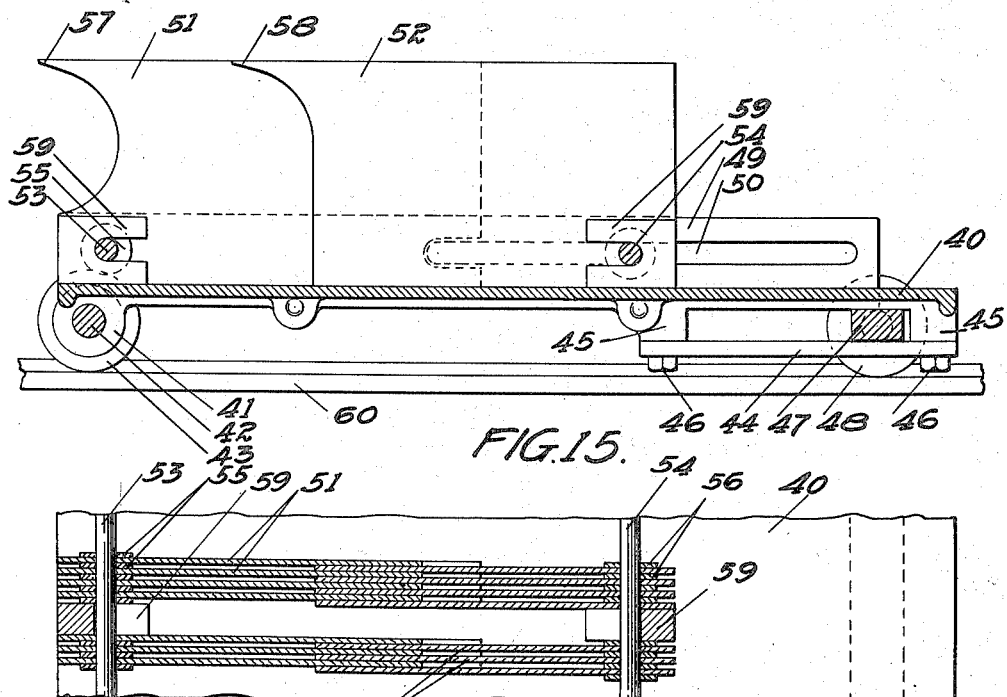
FIG.15.
FIG.16.

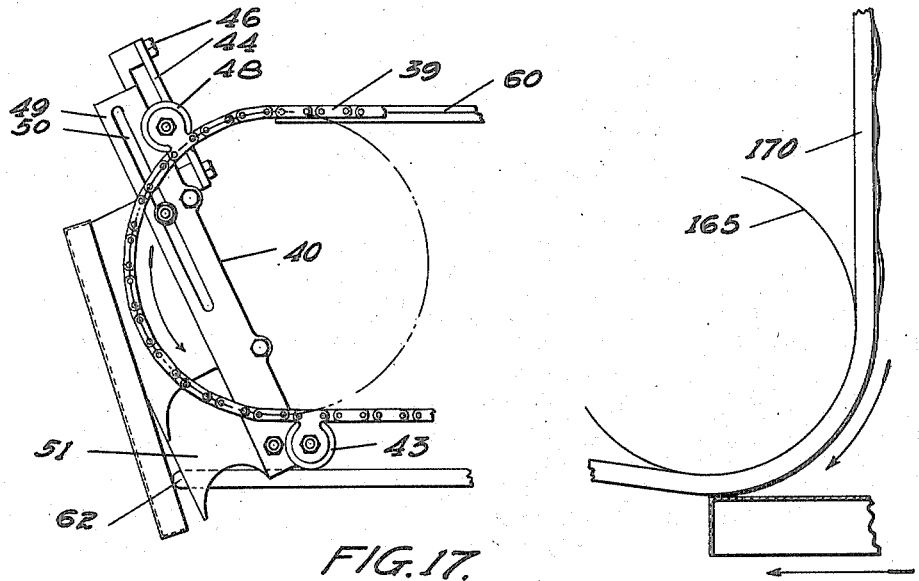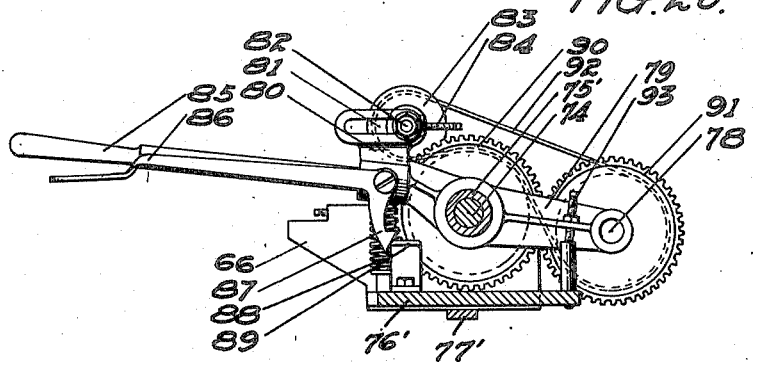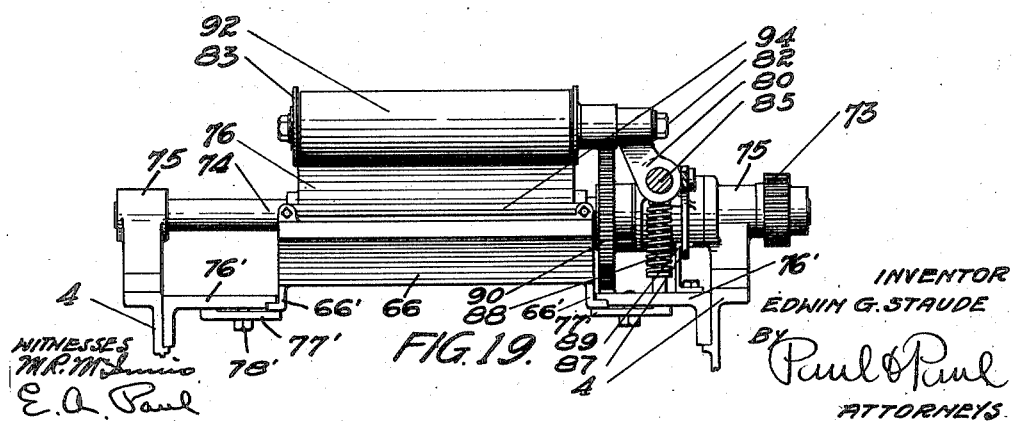

UNITED STATES PATENT OFFICE.

EDWIN G. STAUDE, OF MINNEAPOLIS, MINNESOTA.

BOX-TOPPING MACHINE.

1,314,988. Specification of Letters Patent. Patented Sept. 2, 1919.

Application filed October 13, 1914. Serial No. 866,452.

*To all whom it may concern:*

Be it known that I, EDWIN G. STAUDE, a citizen of the United States, resident of Minneapolis, in the county of Hennepin and State of Minnesota, have invented certain new and useful Improvements in Box-Topping Machines, of which the following is a specification.

This invention relates to improvements in machines designed particularly for applying flexible sheets of paper or other suitable material, or labels, to surfaces of various kinds and more particularly to the top or bottom member of paper or paste-board boxes. The present invention is designed to cover certain improvements and modifications in machines of the general type illustrated, described and claimed in my applications for patent No. 711,001, filed July 22, 1912, issued April 6, 1915, No. 1,134,562 and No. 729,427, filed November 4th, 1912, issued December 7, 1915, No. 1,163,043.

The invention consists generally in means for moistening or wetting and stretching the flexible sheets and applying them while stretched to the surfaces to which they are to be secured.

The invention consists further in novel means for feeding the articles to which the sheets are to be applied.

The invention consists further in novel means for feeding the flexible sheets and registering them with the articles to which they are applied.

The invention consists further in novel means for applying the glue to the article to which the flexible sheets are applied.

The invention consists further in the constructions and combinations hereinafter described and particularly pointed out in the claims.

In the accompanying drawings forming part of this specification,

Fig. 2 is a longitudinal section through a portion of the machine,

Fig. 3 is a plan view of the same,

Fig. 4 is a transverse section on line 4—4 of Fig. 1, a portion of the large drum being in elevation, Fig. 5 is a detail showing the means for wetting the belt and the flexible sheets carried thereby.

Fig. 6 is a detail section on line 6—6 of Fig. 5,

Fig. 7 is a transverse detail section and partial elevation showing part of the mechanism for feeding the flexible sheet to the wetting and stretching belt.

Fig. 8 is a detail section and elevation of a portion of the flexible sheet feed.

Fig. 9 is a transverse vertical section of a portion of the feed roll shown in Fig. 8.

Figs. 10, 11 and 12, are details of the flexible sheet feeding and stretching devices.

Figs. 13, 14, 15, 16 and 17 are details of the means for feeding the flanged box members, or other devices to which the flexible sheets are applied.

Figs. 18 and 19 are details of means for applying the glue to the box member or other article to which the flexible sheet is to be affixed.

Fig. 20 is a detail illustrating the means for stretching the flexible sheet and applying it in its stretched condition to the surface of the box member or other article.

*The machine frame.*

Figure 1:
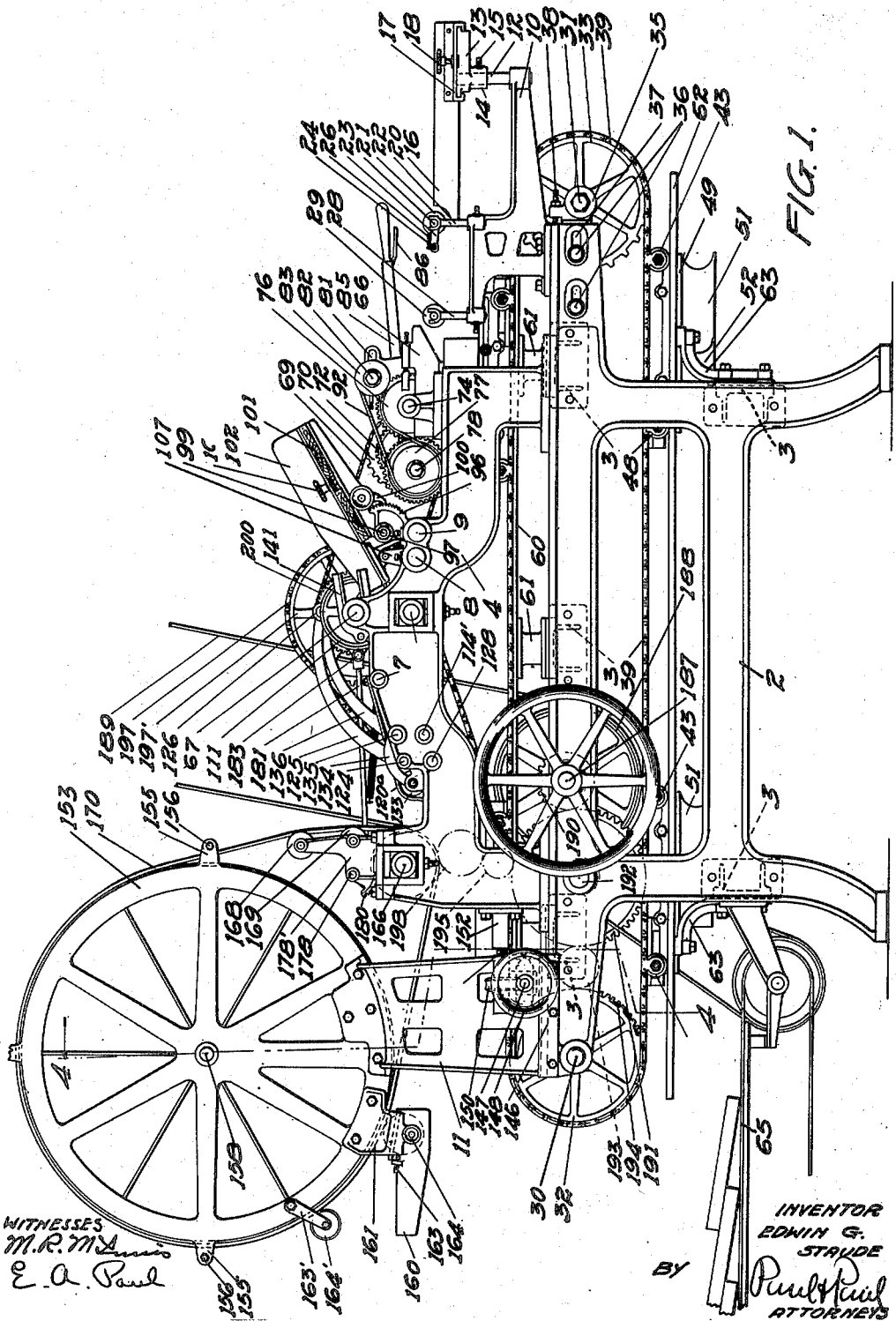
Figure 1 is a side elevation of a machine embodying my invention.

The operative parts of the machine are preferably supported upon a suitable main frame and three auxiliary or supplemental frames supported upon and secured to said main frame.

In all of the drawings 2 represents the main frame which consists of upright, side members or castings and suitable cross bars extending transversely between said side castings and having their ends secured thereto. These cross bars are shown in dotted lines in Fig. 1 of the drawings and I have indicated each cross bar by the numeral 3. The cross bars 3 not only connect the side members of the frame, but they also form supports for various parts of the mechanism.

Supported upon the main frame 2 is an auxiliary frame 4, also composed of side members or castings connected by cross bars 5 and 6 and the stationary shafts 7, 8 and 9. This auxiliary frame is also provided with bearings for a number of transverse rotatable shafts hereinafter described.

At the receiving or forward end of the machine, I preferably provide a second auxiliary or supplemental frame 10, also supported upon the main frame 2, and carrying the feed table upon which the box members or other articles are placed.

A third supplemental frame 11 is arranged at the delivery end of the machine and is preferably secured to the main frame 2. The frame 11 supports the wheel by which the belt that wets and stretches the flexible sheet, is carried, as hereinafter described.

The feed table.

At the receiving end of the machine I provide a feed table upon which the box members or articles to which the flexible sheets or labels are to be affixed, are placed, and from which they are fed in succession. I have shown in the drawings a feed table constructed to receive flanged box covers, one at a time. The same feed table may be used for feeding boxes to the bottoms of which the flexible sheets or labels are to be affixed.

The feed table herein shown comprises suitable standards 12, secured upon the auxiliary frame 10, and supporting at their upper ends a suitable plate 13, preferably provided with sockets 14, which fit upon the ends of the standards 12, and which are secured in position by suitable set-screws 15. By this means the feed table may be vertically adjusted to accommodate box members having flanges of different depths. Side plates 16 are supported upon the plate 13 and are adapted to slide transversely thereon, thereby permitting the feed table to be adjusted for articles of different widths. Each side plate is preferably provided with a flanged bracket 17, the flanges of which engage the edges of the plate 13. Set-screws 18 are arranged to clamp the brackets and with them the side plates 16 in any desired position. The plates 16 are provided with the inwardly turned ledges or flanges 19. The plates 16 are adjusted so as to permit the box member or other article to be placed in position as shown in Figs. 13 and 14, with the edges of the side flanges resting upon the ledges or flanges 19.

For the purpose of regulating the position of the articles placed on the feed table I provide on the frame 10, standards 20 having forked upper ends. In these standards are placed a shaft 21 carrying rolls 22. Said brackets have horizontally projecting arms 23 connected by a rod 24. A sleeve 25 is mounted loosely upon the shaft 21 between the rolls 22 and a spiral spring 26 connects a lug on the sleeve 25 with a lug secured to the fork 26'. A finger 27 secured to the sleeve 25 projects downwardly standing in a substantially vertical position practically flush with the end of the side plates of the feed table. (See Fig. 13).

The box member or article to be fed is placed between the side plates 16 of the feed table with the end of the article resting against the finger 27, which forms a stop and determines the position of the article. When the box member or other article is fed from the table, as hereinafter described, the stop turns against the tension of the spring 26, and permits the article to move by it and under the rolls 22. These rolls tend to hold the article down in proper position when it is engaged and moved by the carrier hereinafter described. I prefer to provide a second set of standards 28 upon the auxiliary frame 10 in which a roll 29 is mounted, substantially on a level with the rolls 22. (See Fig. 1). The box member or other article being carried forward from the feed table passes under the roll 22 and the roll 29 and is thereby held down in proper position to pass under the gluing device hereinafter described.

The carrier.

I provide means for taking the box member or other article from the feed table, moving it past the gluing device, where a suitable supply of glue is applied to its surface, and then moving said article forward to have the flexible sheet or label, which in the meantime will have been suitably wet and stretched, applied thereto. The carrier that I prefer to employ consists of a series of carriages arranged to travel upon suitable tracks or rails, and connected with suitable endless chains by which they are moved. Each carriage is provided with a sectional support which may be adjusted to adapt it for carrying flanged articles of any desired length and width.

The frame of the machine is provided at its rear end with a suitable shaft 30 having a pair of sprocket wheels 32, and at its forward end with studs 31 upon which are arranged the sprocket wheels 33. (See Fig. 4). The shaft 30 and the studs 31 are mounted in suitable boxes, and the boxes supporting the studs 31 are preferably made adjustable. The studs 31 as here shown are mounted in boxes 35 arranged between the side members of the frame 2 and held in position by bolts 36 which pass through slots 37 in the frame. Adjusting screws 38 are provided by means of which these boxes may be adjusted lengthwise of the machine. Sprocket chains 39 pass around the sprocket wheels 32 and 33, these chains extending lengthwise of the machine parallel to each other. A carriage 40 is connected to the chains 39 at suitable intervals throughout the length of said chain. As here shown each carriage consists of a flat plate provided with suitable ears 41 through which extends a shaft 42 provided with wheels 43. These ears and shafts are located at the forward end of the carriage. At the rear end of the carriage is an elongated recess formed by a narrow bar 44 secured to lugs 45 by suitable bolts or screws 46. A shaft 47 extends through the recess thus formed at the rear end of the carriage. The ends of the shaft 47 are provided with suitable wheels 48. The shaft 47 is preferably formed of a flat bar having cylindrical ends. The flat portion of the shaft extends through the recesses formed by the bars 44 and lugs 45. This arrangement permits the shaft 47 to slide in these slots. Each carriage 40 is preferably provided with narrow side walls 49 having horizontal slots 50 arranged in the rear portion of said walls. Sectional plates 51 and 52 are arranged to stand upon edge on the carriage 40 between the side walls 49. These plates are held in position by the transverse rods 53 and 54, which extend through the side walls 49 and through said plates 51 and 52. The rod 53 which is located at the front of the carriage extends through the plates 51. The rod 54, which extends through the slot 50 in the side walls 49, extends through the plates 52. The plates are preferably alternately arranged, as shown in Fig. 6 of the drawings, and the plates 52 are adapted to slide between the plates 51, this movement being permitted by the slots in the side walls 49. Each pair of plates 51 is preferably separated by a washer 55 and the plates 52 are separated by similar washers 56. The forward upper edges of the plates 51 and 52 are provided with suitable points 57 and 58.

It will be noted that these plates form a sectional support, extending upward from the carriage 40 when said carriage is above the upper reach of the carrying chain, and this support is adjustable both as to length and width. It is adjustable as to length by sliding the plates 52 between the plates 51 toward the front of the carriage or vice versa. The slots 50 permit the sliding of the plates 52. These slots are preferably of such length and they are so arranged as to permit the points 58 to be moved forward so as to be opposite the point 57. It is adjustable as to width by separating the plates into two groups and inserting spacing blocks 59 between them. (See Figs. 14 and 16.)

The frame of the machine is provided with an upper horizontal track or rail 60 supported upon blocks 61, and with a lower horizontal rail or track 62 supported upon brackets 63 secured preferably to the lower cross bars 3 on the frame of the machine.

The chains 39 are provided with ears 64 to which the ends of the shafts 42 and 47 are connected.

The wheels or rolls 43 and 48 of the carriages 40 are adapted to rest and ride upon these rails. They will ride upon the upper rail when they are moving the box members or other articles forward through the machine, and they move upon the lower rail 62 when they are traveling back empty, with the lower reaches of the chains, after having delivered the box members or articles carried by them.

In passing around the sprocket wheels 32 and 33 the shafts 47 slide in the slots formed by the lugs 45 and bar 44, as clearly shown in Figs. 13 and 17 of the drawings. As the carriage is brought around the sprocket wheel 33 it stands at an angle to the horizontal, as shown in Fig. 33, and the points 57 engage the forward flange of the box member that is on the feed table and carry the same forward with the carriage, the stop 27 turning against the tension of the spring 26 to permit this movement. After the carriage passes around the wheels 33 it comes into a horizontal position and as the box member leaves the feed table it drops down over the sectional support on the carriage and moves forward in a subtantially horizontal plane. By means of spacing blocks 59 enough of the plates may be brought together to correspond to the width of the box member, or other article, and the plates 52 may be adjusted longitudinally to adapt the sectional support to the length of said article. The sectional support formed by the upper edges of the plates 51 and 52 will present a flat upper surface forming a firm and smooth bearing throughout its length and width for the articles being carried forward and to which the flexible sheet or label is to be affixed. As the carriages pass around the sprockets 32 at the other end of the machine, as indicated in Fig. 17 of the drawings, the articles to which the sheets or labels have been affixed will be discharged, and they may be received upon an endless belt or carrier as illustrated in Fig. 1. I prefer to arrange one of the lower rails 62 with its end projecting beyond the center of the wheel 32 (see Figs. 1 and 17), and in line with the flange of the box member or article that is on the carriage when it comes around the sprocket wheels at the rear of the machine. This will cause the edge of this flange to come in contact with the end of the rails 62 and the cover will be pushed off from the carriage and allowed to drop onto the belt or other device arranged to receive the same.

*The glue applying device.*

While the box member or other articles are being carried forward through the machine by the means hereinbefore described, I desire to apply an even coating of glue to the upper surface of said articles. For this purpose I provide a glue pot or receptacle 66. preferably in the form of an open tray, that is adjustably supported in the frame of the machine above the line of travel of the carriages 40. As here shown the glue receptacle is provided with legs 66' having horizontal flanges at the lower end, and these flanges are brought upward into recesses in the under side of plates 76' secured to the frame of the machine. They are held in position by clip plates 77' secured by screws 78'. By this means the glue receptacle can be adjusted lengthwise of the machine.

A counter shaft 67 which is mounted in bearings in the frame of the machine and which is driven from another shaft, hereinafter referred to, by a suitable sprocket chain, is provided with a sprocket wheel 68, around which extends a driving chain 69. This chain extends around a sprocket wheel 70 mounted on a stud 71 and having secured to or formed integrally therewith a gear 72, which meshes with a pinion 73 on the shaft 74 that is mounted in bearing boxes 75 on the frame of the machine. This shaft extends across and above the glue receptacle and it is provided with a drum 76 that projects into said glue receptacle, dipping into the glue or paste therein.

A sleeve 75' surrounds the shaft 74 within one of the bearings 75 and projects inwardly beyond said bearing. An arm 79 is pivotally supported on the sleeve 75'. At one end of this arm a shaft 78 is mounted which carries a drum 77. The other end of the arm has an upwardly projecting lug 80 provided with a slot 81, and a shaft 82 carrying a small drum 83 is secured in this slot and is provided with an adjusting screw 84 by means of which the position of the shaft 82 in the slot 81 may be regulated. A handle 85 is connected to the end of the arm 79 and a lever 86 provided with a hook 87 is pivoted upon the side of the arm 79 near the end thereof. A spring 88 is arranged under the end of the arm which carries the small drum 83 and said spring tends to raise this end of the arm and to depress the opposite end, carrying the drum 77. A lug 89 is provided below the arm 79 and when this end of the arm is depressed the hook 87 engages said lug 89 thereby raising the opposite end of the arm 79 and holding it in its raised position. A gear 90 is provided on the shaft 74 which is in mesh with a gear 91 on the end of the drum 77. A belt 92 passes around the drums 77 and 83 and over the drum 76. (See Fig. 2).

In operation the drum 76 is positively rotated by the rotation of the shaft 74 and the drum 77 is positively rotated by means of the gears 90 and 91 connecting said drums. The drum 76 running in the glue pot will take up considerable glue. This will be carried up and come in contact with the outer surface of the belt 92. As the belt travels in the direction of the arrow in Fig. 2, the outer surface of the belt, with the glue thereon, will come in contact with the upper surface of the box, box cover or article being moved forward by the carrier hereinbefore described. The surface of the belt is caused to travel at a less rate of speed than the traveling carriages, which carry the articles. The result will be that as said carriages pass under the drum 77 the tops of the articles being carried forward by the carriages will pass under the belt 92, and, owing to the greater speed of the carriage, there will be a wiping action between the belt and the surface of the article being carried forward. This will spread an even coating of glue over said surface, and the article will then pass on to receive the flexible sheet or label as hereinafter described. When the machine is running idle the operator can, by pressing down upon the handle 85, tilt the arm 79 upon the sleeve 75' and thereby raise the drum 77 and the belt so that said belt will be free from contact with the carriages or articles thereon. The arm can be locked in this position by means of the hook 87 and the stud 89. The slot 81 in the lug 80 permits the upper or small drum 83 to be adjusted so as to tighten the belt 92. An adjustable stop 93 is provided to limit the movement of the arm 79. A suitable scraper 94 is arranged in connection with the drum 76 so as to remove the surplus glue therefrom.

*The flexible sheet feeding device.*

The flexible sheets or labels that are to be applied to the box members or other articles hereinbefore referred to are placed loosely in piles in a suitable hopper, from which they are removed one by one and fed forward to be moistened, stretched, and applied to the articles carried forward by the traveling carriages.

As hereinbefore stated 8 and 9 are stationary bars or shafts extending across the machine and having their ends mounted in the auxiliary frame 4. A suitable casting 95 is mounted upon the stationary shafts 8 and 9, extending around both shafts near each end thereof. This casting is provided with the upwardly projecting extension having a quadrant-shaped rack-bar 96 and a pivot bearing 97. Bars 98 are pivotally supported in the bearings 97 by suitable pivots 99 and each of said bars is provided with a dog 100, mounted on a shaft 100' and adapted to engage the teeth of the quadrant-shaped rack-bar. Suitable boards or plates 101 are supported upon the bars 98 extending across from one to the other. These boards or plates are preferably separated as shown in Figs. 2 and 3, leaving a narrow space or slot between them. Upright plates 102 that form the side walls of the hopper are adjustably secured upon the plates 101 at the proper distance apart to accommodate the particular flexible sheet or label that is to be applied and these side plates are held in any desired position by means of screws 103 engaging nuts 104 on the under side of the plates 101. These screws may be moved along the space between the two plates 101 thereby adjusting the upright plates 102 with them and said screws will then be tightened so as to lock said upright plates in any desired position. A suitable sheet of tin or other material 104' is preferably placed in the bottom of the hopper between the side plates 102. (See Figs. 2 and 3). At the lower end of the hopper suitable retarding blocks 105, preferably formed of rubber or other suitable material, are secured to suitable arms preferably in the form of bell-cranks 106 that are pivoted near the center of the machine upon the studs 107, preferably supported upon the bar or shaft 8. For adjusting these retarding blocks I preferably provide a stud 108 having a threaded end upon which is placed a hand-wheel 109. This stud projects from the lug 107 and it is surrounded by a suitable spring 110. By this means the surfaces of the retarding blocks may be elevated or depressed as may be required for the proper feeding of the sheets from the hopper.

The shaft 67 hereinbefore referred to, extends across the machine, a short distance above the lower end of the hopper from which the flexible sheets are fed. (See Fig. 2). This shaft preferably carries two feeding wheels 111 suitably spaced apart and provided with suitable friction blocks 111' arranged to contact with the upper surface of the uppermost sheet in the hopper close to the lower edge thereof and directly over the retarding block 105. (See Fig. 2). The rotation of these wheels with the shaft 67 causes the flexible sheets to be fed successively from the hopper beneath said wheels 111. As said flexible sheets pass under the wheels 111 they are taken up by narrow belts 112 mounted upon the rolls 113, 114, the rolls 113 being arranged directly below said wheels 111, on a shaft 113', while the rolls 114 are mounted on a shaft 114'. Suitable guide-plates 115 are arranged on opposite sides of the belts 112 and these plates are capable of lateral adjustment, being locked in position by adjusting screws 116 extending through a slot in the cross bar 6, and having nuts 117 located upon their lower ends within said cross bar. These guide-plates extend vertically parallel with the belts 112 and in operating the machine these guide-plates are adjusted to correspond to the width of the flexible sheets that are used. Each of the guide-plates 115 has a horizontal ledge or flange 115' arranged substantially in the same plane with the belts 112. These flanges support the edges of the flexible sheet as they are moved forward by the belts 112. The guides plates 115 preferably extend from the feed rollers to the stop 121. Beyond the discharge ends of the belts 112 the flanges 115' are preferably made of slightly greater width, and the wider section has a downwardly turned lip 115'' as shown in Figs. 2 and 3 of the drawings, to prevent the end of the flexible sheet from catching on the end of this wider section of the flange.

Above each of the belts 112 is an arm 118 secured to the cross bar or stationary shaft 7 and having a forked and slotted lower end carrying a small idle wheel 119. These arms extend over the belts 112 and the rolls 119 rest upon the upper surfaces of the flexible sheet, putting sufficient weight on the sheets to cause them to move forward with the belts. The flexible sheets travel forward, passing over rollers 120, until their lower edges come in contact with the stop 121. The lower portions of the sheets will then rest upon the upper surface of the cross bar 5. The parts will then be substantially in the position shown in Fig. 2 of the drawings. The stop 121 is formed upon the lower end of a finger 122 secured to a block 123 that is clamped upon a rock shaft 124. This shaft extends across the machine and is mounted in bearings in the side of the frame. An arm 125 has one end secured to the rock shaft 124 and the other carries a roller 126 that engages the edge of a cam 127 upon the shaft 67. (See Figs. 2, 3, 10, 11 and 12). This cam acts at the proper time through the arm 125 to rock the shaft 124 thereby lifting the stop 121 and permitting a flexible sheet whose edge has been resting against said stop to be moved forward for the next step in the operation of the machine.

To prevent the flexible sheet from moving upward with the stop 121, I preferably provide a stripping device consisting of a bar 120ª secured to the stationary shaft 7, and extending forward and provided with a forked end 120ᵇ that straddles the finger 122 carrying the stop 121. (See Figs. 2, 3, 10, 11 and 12).

Below the shaft 124 is a shaft 128 having its ends mounted in bearings in the frame of the machine. This shaft is provided with forwardly projecting arms 129 in the ends of which is mounted a shaft 130, upon which the rollers 120 hereinbefore referred to, are mounted. While the shaft 128 is normally stationary it can be moved in its bearings so as to raise or lower the shaft 130 carrying the rollers 120, and thereby the surfaces of the said rollers may be brought to the right height to receive and support the flexible sheets that are brought forward by the belts 112.

I also prefer to provide upon the shaft 128 a series of narrow-faced, idle rollers 131. The lower edges of these rollers are practically level with the upper surface of the box member or other article that is brought forward by the carrier. (See Fig. 11.) These rollers preferably do not come in contact with the upper surface of the article upon which the glue has been spread, in the normal operation of the machine, but if the surface of the article is warped or if it in any way gets above its normal position it will come in contact with the rollers which have very narrow faces, said faces being practically knife-edges. The glue will not be disturbed by this contact with the rollers as the box member or other article is moved under them. These rollers serve to hold the box member or article to which the sheet is to be affixed, down, and keep it from coming in contact with the idle rollers 120. If the fresh glue from the box member or other article was to come in contact with the rollers 120, it would result in causing the flexible sheets to stick to said rollers and would thus interfere with the work of the machine. Above the shaft 130 is a shaft 132 carrying the feed rollers 133. These rollers are preferably secured to said shaft and they rotate therewith. The shaft 132 is mounted to rotate in bearings carried by the forward end of rock arms 134. The rear ends of these arms are secured to the rock shaft 135 that is mounted in bearings in the frame of the machine. An arm 136 is secured to this shaft and its end is provided with a wheel 137 that rides upon the edge of the cam 138 that is upon the shaft 67. The operation of this part of the mechanism is to cause the shaft 132 to be moved downward causing the rolls 133 to press upon the upper surface of the flexible sheet and thereby to grip said sheet between themselves and the rolls 120. The shaft 132 is provided near one end with a pinion 139 that is arranged to mesh with a sliding rack-bar 140. The opposite end of this rack-bar is connected to a fork 141 that straddles the shaft 67 and is provided with a roller 142 adapted to be engaged by a cam 143 arranged on said shaft 67. A spring 144 normally draws the fork toward the shaft 67. A housing 145 is provided that incloses the lower end of the rack-bar 140 from the pinion 139. (See Fig. 8). This holds these parts in mesh with each other notwithstanding the fact that the shaft 132 is raised and lowered to bring the rolls 133 out of or into contact with the upper surface of the flexible sheet as hereinbefore described.

In the operation of the machine the parts are so timed that when the rolls 133 are brought downward to grip the flexible sheet between themselves and the rolls 120 the stop 121 is lifted to release said sheet, and the rolls 133 are then rotated, through the rack-bar 140 and the pinion 139, thereby feeding the flexible sheet forward into position to be acted upon in the next step in the operation of the machine.

*Means for wetting and stretching the flexible sheets.*

The next step in the operation of the machine, wets and stretches the flexible sheets, and, while they are in stretched condition, applies them to the freshly glued surfaces of the box members or other articles to which they are to be affixed.

The auxiliary frame 11 rests upon the main frame of the machine, being held in position by clip plates 146. (See Fig. 4). A shaft 147 is mounted in bearings in this frame and is provided with a hand wheel 148 and with the two short worm-screws 149. These screws engage worm wheels 150 upon a shaft 151 having threaded ends that engage blocks 152 upon the main frame of the machine. By turning the hand-wheel 148 the auxiliary frame 11 and the parts carried thereby are moved longitudinally on the main frame of the machine.

The lower part of the auxiliary frame 11 is preferably in the form of standards having inwardly turned upper portions to which are secured circular plates 153, which form the upper part of the auxiliary frame. Said plates are preferably provided with a series of openings and with inturned circular flanges 154. They are also preferably provided with ears 155 connected by rods 156. These plates also have suitable bearings 157 in which is mounted a shaft 158 carrying a wide-faced wheel 159. This wheel may be of any suitable construction. I prefer to provide an ordinary wheel having a hub, a series of spokes and a smooth and preferably sheet metal rim, secured to the outer ends of said spokes. (See Figs. 1, 4 and 5).

A suitable water trough 160 is supported upon hangers 161 beneath the upper part of the auxiliary frame. Within this trough is arranged an idle roller 162. This roller is preferably formed of felt or other suitable material. The hangers 161 are preferably provided with inclined grooves 161ª and the water trough is provided with ribs 160ª adapted to engage with and slide in these grooves, and the relation of the trough to the surface of the belt is such that the contact between the surface of the roll and the surface of the belt is regulated by adjusting the trough longitudinally on the hangers by means of suitable adjusting screws 163. Clamping screws 164 may be provided upon the hangers for locking the trough and roll after the same have been adjusted to the desired position. A second roller 164' is preferably supported above the trough 160 with its surface in contact with the surface of the belt. This roll is preferably supported by adjustable hangers 163' whereby the pressure between the roll and the belt may be regulated. This roll is designed to remove surplus water from the belt causing the same to fall into the trough.

The main frame of the machine is also provided with a roller 165 carried by a shaft 166 mounted in bearings 167, and arranged above this roller, and preferably mounted in bearings in standards 178' are two idle guide-rollers 168 and 169. A belt 170 preferably formed of rubber passes around the wheel 159 and the roll 165. The belt also passes outside of the guide rollers 168 and 169. The belt passes between the rolls 162 and 164' and the face of the wheel 159.

It will be noted that the roll 165 is considerably smaller than the wheel 159, and hence that said belt is given a short turn as it passes around the roll 165.

Mounted upon a shaft 166 are a pair of swinging yokes 171. These yokes extend below the face of the roll 165 and each has mounted in it a roll of small diameter 172 having a series of annular ribs upon its surface. The ends of this shaft 172 are mounted in blocks 173 arranged in slots in said yokes and normally held in an elevated position by springs 174. The yokes 171 are not mounted directly upon the shafts 166 but upon stationary sleeves 175 through which said shaft passes, these sleeves being held in bearings in the frame of the machine. (See Fig. 7). A stationary cam 176 is adjustably secured near each end of the roll 165 upon said sleeve. The end of said cam is inclined and is located very close to the stop 121 hereinbefore referred to. When the yokes 171 are in position to bring the ends of the shafts 172 against the inclined ends of the cams 176, the roll 172 is moved away from the surface of the belt. (See Fig. 12.) When the yokes are rocked as hereinafter described so as to move the roll 172 away from the ends of the stationary cams 176, the springs 174 move the roll 172 against the surface of the belt. (See Figs. 2, 10 and 11.)

The ribs on the small roll 172 have preferably very narrow faces. (See Fig. 7.) The purpose of this construction is to cause the roll to present a small amount of surface to the flexible sheet which passes between the roll and the belt, and thereby prevent the sticking of the sheet to this roll. If an ordinary roll were used the sheet might stick to the roll and wind up on it instead of adhering to the belt and passing along with it as hereinafter explained.

The upper end of each yoke 171 is made in the form of a gear segment 177. (See Figs. 10, 11 and 12.) A rock-shaft 178 is mounted in bearings in the standards 178' above the roll 165 and this shaft is provided with arms 179 having gear segments 180 that mesh with the gear segments 177 on the yokes 171. (See Figs. 2, 7, 10, 11 and 12.) A rod 181 is connected to an arm 182 on the rock shaft 178 and this arm carries a roller 183 bearing against the face of the cam 184 on the shaft 67. A spring 185 is connected to the rod 181 and to the stationary shaft 7. This spring holds the roller 183 at all times in contact with the face of the cam 184. The rod 181 is provided at its end with a fork 186 that embraces the shaft 67 and serves to guide the rod in its reciprocatory movement.

*Driving means.*

It will be understood that the various parts of the machine may be driven from a line shaft or other suitable source of power by any desired arrangement of driving belts, shafts, pulleys and gears. I have shown in Fig. 1 of the drawings a shaft 187 mounted in bearings in the frame of the machine. This shaft is provided with a pulley 188 and is driven by a suitable belt 189, which may receive power from any suitable device. The shaft 187 is also provided with a pinion 190 which meshes with a gear 191 on a shaft 192, also mounted in bearings in the main frame of the machine. A pinion 193 is arranged between the gear 191 and a suitable gear 194 upon the shaft 30. (See Fig. 4.) The gear 191 also drives a gear pinion 195, upon a stud 196. This pinion has a sprocket pinion connected to it and a sprocket chain 197 extends from this sprocket pinion to the sprocket 197' on the shaft 67. An idler pinion 198 is driven by the pinion 195 and this idler pinion engages the gear 199 upon the shaft 166 of the roll 165. The shaft 67 is provided with a suitable gear 200 which meshes with a pinion (not shown) on the shaft carrying the belt pulley 113.

I do not limit myself, however, to any particular arrangement of the driving mechanism of the machine. The same may be varied in many particulars without departing from my invention.

*General operation.*

The various parts of the machine are adjusted to adapt the machine for operation upon the particular size of box cover, box or other article that is to receive the flexible sheet or label. With the type of feed table here shown the articles are placed one at a time thereon. Each article is removed from the table by the engagement of the carriage with its front flange as illustrated in Fig. 13, and it is moved forward by the carrier and receives an even coating of glue upon its upper surface as it passes the glue applying device. At the proper point in its travel the flexible sheet is applied.

The flexible sheets are placed in the hopper arranged to receive a bunch of said sheets with their lower ends feathered out as shown in Fig. 2 of the drawing. These sheets are removed one at a time from the top of the bunch and are carried forward by the belts 112 and each sheet is brought against the stop 121, where it is held until the proper time for its next movement.

When the sheet is in this position the roller 172 will be in front of the stop 121, as shown in Fig. 2 of the drawings, and it will remain in this position until the sheet that has previously been applied to the belt has been wet and stretched and applied to the box member or other article. At the proper time in the operation of the machine the yoke 171 will be oscillated and the roller 172 will be moved from the position shown in Fig. 2 of the drawings to substantially the position shown in Fig. 10. At the same time the stop 121 will be raised, the flexible sheet will be gripped between the rollers 133 and 120 and will be moved forward so that the edge of the sheet will pass above the roller 172 and between said roller and the surface of the belt 170. As the roller 172 is moved forward from the position shown in Fig. 2 to that shown in Fig. 10 it passes away from the cams 176 and causes the sheet to be gripped between said roller and the surface of the belt. The roller 172 continues to move forward as the yokes supporting the same are rocked until said roller comes substantially in the position shown in Fig. 11. During this time it will have pressed the flexible sheet against the wet surface of the belt, and the sheet will adhere to the belt and pass along with it, leaving the roller 172 in substantially the position shown in Fig. 11. As heretofore explained the surface of the roller 172 is reduced by means of the grooves formed in the ribs thereon, so that there is little tendency of adherence between the flexible sheet and this roller. The flexible sheet adhering to the belt travels forward and passes by the wetting roller 162, where it receives a thorough wetting. The surplus water is removed by the roll 164'. The sheet continues to travel with the belt and the wetting of the sheet will cause it to stretch so that there will usually be a number of wrinkles in the sheet when it reaches the point where the belt begins to travel around the guide rolls 168 and 169 and the roll 165.

I have illustrated this by the detail view Fig. 20. As the belt travels around the roll 165 its outer surface moves through a greater radius than its inner surface, and hence the surface of the belt is stretched at this point, and the adhering wet label or flexible sheet will also be stretched. The flexible sheet has now made a complete circuit with the belt and got back to the point at which it started. The travel of the carriages is so timed that just as the edge of the sheet reaches the point at which it can come in contact with the box cover or other article, the end of the box member or other article reaches the same point. (See Fig. 20). In the forward movement of the article from this point the stretched sheet will be pressed upon the top of the article, which is firmly held by the sectional support on the carriage, and the sheet and the article will be firmly pressed together, and will be caused to adhere by the coating of glue upon the upper surface of the article.

The flexible sheet being applied in its stretched condition, no wrinkles will appear in the same after it is affixed to the article. On the contrary the sheet will present a smooth and attractive appearance, which it is difficult, if not impossible, to get except by applying the sheet in a moistened and stretched condition. Soon after the affixing process is completed the articles will be discharged from the carrier as hereinbefore explained and may be removed by the carrier belt 65 or by any other suitable device.

I have designed this machine particularly for covering the tops of box covers or the bottoms of boxes, both of which are usually supplied with flanges and in using the machine for applying the flexible sheets to these articles the carrier herein shown and described is employed. It is obvious, however, that if it is desired to apply the flexible sheets to cardboard or other articles not provided with flanges, the same can be done by substituting for the carrier herein shown and described, a carrier adapted to feed flat articles. In this operation the structure and arrangement of the means for feeding, stretching and applying the flexible sheets can be used without material change.

It is obvious that the details of construction may be modified in many particulars without departing from my invention.

I claim as my invention:

1. The combination, with means for feeding in succession articles to each of which a flexible sheet or label is to be affixed, and means for gumming the surface of each article, of means for feeding a series of flexible sheets or labels, means for causing the forward edge of each flexible sheet or label to register with a predetermined line on the surface to which the sheet or label is to be affixed, and means for pressing each flexible sheet or label against the gummed surface of the article as the article and the sheet or label are advanced.

2. The combination, with means for feeding in succession articles to each of which a flexible sheet or label is to be affixed, and means for gumming the surface of each article, of means for feeding a series of flexible sheets or labels, means for causing the forward edge of each flexible sheet or label to register with a predetermined line on the surface to which the sheet or label is to be affixed, and a drum arranged to press each flexible sheet or label against the gummed surface of the article as the article and the sheet or label are moved by said drum.

3. The combination, with a feed table adapted to receive and hold a flanged box member, of feeding means composed of adjustable sections adapted to lie within the flanged box member in the operation of feeding the same, means for gumming the surface of said box member, a flexible sheet feeding means, means for registering the flexible sheet with the box member, and means for pressing the flexible sheet upon the gummed surface of the box member.

4. In a machine of the class described, the combination, with means for feeding an article to which a flexible sheet is to be applied, of a glue receptacle arranged above said feeding means, a drum arranged above said feeding means with its axis at right angles to the line of feed, means for vertically adjusting said drum, an endless belt arranged to pass over said glue receptacle and around said drum, means for transferring glue to the surface of the belt and means for driving said belt at a surface speed less than the surface speed of the feeding means.

5. In a machine of the class described, the combination, with means for feeding an article to which a flexible sheet is to be applied, of a glue receptacle arranged above said feeding means, a drum arranged above said feeding means with its axis at right angles to the line of feed, means for vertically adjusting said drum, an endless belt arranged to pass over said glue receptacle and around said drum, and means for transferring glue to the surface of the belt.

6. In a machine of the class described, the combination, with means for feeding an article to which a flexible sheet is to be applied, of a glue receptacle arranged above said feeding means, a drum arranged above said feeding means with its axis at right angles to the line of feed, means for vertically adjusting said drum, an endless belt arranged to pass over said glue receptacle and around said drum, and a glue transferring drum arranged within said receptacle and in engagement with the surface of the belt.

7. In a machine of the class described, the combination, with means for feeding an article to which a flexible sheet is to be affixed, of means arranged to hold a plurality of flexible sheets, means for feeding said sheets in succession, a stop arranged to engage and hold each sheet at a predetermined point in its forward movement, means for moving said stop out of the path of movement of said sheet, feed rolls arranged to engage and move forward said sheet after its release from said stop, and means for applying the sheet to the surface of the article.

8. In a machine of the class described, the combination, with means for feeding an article to which a flexible sheet is to be affixed, of a hopper arranged to contain a plurality of flexible sheets, means for feeding said sheets in succession from said hopper, a stop arranged to engage and hold each sheet at a predetermined point in its forward movement, means for moving said stop out of the path of movement of said sheet, feed rolls arranged to engage and move forward said sheet after its release from said stop, means for wetting and stretching said flexible sheet and means for applying said sheet in its wet and stretched condition to the surface of the article.

9. In a machine of the class described, the combination, with means for feeding an article to which a flexible sheet is to be affixed, of means for feeding a flexible sheet, an endless belt against the surface of which said flexible sheet is fed, and to which the sheet adheres, means for wetting the belt and the sheet adhering thereto, and means for bringing the sheet while carried by the belt into contact with the surface of the article, thereby causing the sheet in a wet condition to be applied to the article.

10. In a machine of the class described, the combination, with means for feeding an article to which a flexible sheet is to be affixed, means for feeding a flexible sheet, an endless belt, a wheel around which said belt passes, a second wheel of smaller diameter than the first named wheel around which said belt also passes, means for applying the flexible sheet to the surface of said belt, means for wetting the belt and the flexible sheet adhering thereto, and means for bringing the sheet while it is adhering to said belt into contact with the surface of the article to which it is to be affixed.

11. In a machine of the class described, the combination, with means for feeding an article to which a flexible sheet is to be affixed, of means arranged to hold a plurality of flexible sheets, means for feeding said sheets in succession, a stop arranged to engage each sheet at a predetermined point in its forward movement, means for moving said stop out of the path of movement of said sheet, feed rolls arranged to move forward said sheet after its release from said stop, and a drum arranged to engage said sheet and press it against the surface of the article.

In witness whereof, I have hereunto set my hand this 9th day of October, 1914.

EDWIN G. STAUDE.

Witnesses:
EDWARD A. PAUL,
C. H. REHFUSS.